(12) United States Patent
Ryba

(10) Patent No.: US 7,847,730 B2
(45) Date of Patent: Dec. 7, 2010

(54) SOFTWARE DEFINED NAVIGATION SIGNAL GENERATOR

(75) Inventor: Martin F Ryba, Westford, MA (US)

(73) Assignee: BAE SYSTEMS Information and Electronic Systems Integration, Inc., Nashua, NH (US)

(*) Notice: Subject to any disclaimer, the term of this patent is extended or adjusted under 35 U.S.C. 154(b) by 681 days.

(21) Appl. No.: 11/535,599

(22) Filed: Sep. 27, 2006

(65) Prior Publication Data

US 2008/0074322 A1    Mar. 27, 2008

(51) Int. Cl.
G01S 19/32 (2010.01)
G01S 1/08 (2010.01)

(52) U.S. Cl. .................................. 342/357.72; 342/386

(58) Field of Classification Search ................ 342/386, 342/357.06, 357.09, 357.12
See application file for complete search history.

(56) References Cited

U.S. PATENT DOCUMENTS

| | | | |
|---|---|---|---|
| 4,866,450 A | 9/1989 | Chisholm | |
| 5,311,194 A | 5/1994 | Brown | |
| 5,341,301 A * | 8/1994 | Shirai et al. | 342/357.12 |
| 5,590,156 A | 12/1996 | Carney | |
| 5,686,924 A * | 11/1997 | Trimble et al. | 342/357.09 |
| 5,828,858 A | 10/1998 | Athanas et al. | |
| 5,886,665 A | 3/1999 | Dosh et al. | |
| 5,886,666 A | 3/1999 | Schellenberg et al. | |
| 5,907,697 A | 5/1999 | Barbier et al. | |
| 5,959,575 A * | 9/1999 | Abbott | 342/357.06 |
| 5,995,556 A | 11/1999 | Thomas, Jr. | |
| 6,031,487 A | 2/2000 | Mickelson | |
| 6,047,115 A | 4/2000 | Mohan et al. | |
| 6,067,484 A * | 5/2000 | Rowson et al. | 342/357.06 |
| 6,121,923 A | 9/2000 | King | |
| 6,128,276 A | 10/2000 | Agee | |
| 6,182,258 B1 | 1/2001 | Hollander | |
| 6,201,510 B1 | 3/2001 | Lopez et al. | |
| 6,204,687 B1 | 3/2001 | Schultz et al. | |
| 6,215,898 B1 | 4/2001 | Woodfill et al. | |
| 6,216,191 B1 | 4/2001 | Britton et al. | |

(Continued)

FOREIGN PATENT DOCUMENTS

EP    1 187 042 A1    3/2002

(Continued)

OTHER PUBLICATIONS

T. Spinney et al., Standard satellite data bus initiative, Digest of the IEEE Aerospace Applications Conference, Feb. 1989.*

(Continued)

*Primary Examiner*—Thomas H Tarcza
*Assistant Examiner*—Fred H Mull
(74) *Attorney, Agent, or Firm*—Vern Maine & Associates

(57) ABSTRACT

A navigation signal generator on a framework that provides a standardized object-oriented means for developing and managing signal processing functions. The framework provides the ability to dynamically reallocate functions allowing numerous communications, signals intelligence, and information warfare missions that may be required under a single platform and co-exist with other frameworks. In one embodiment the system is a software defined navigation augmentation using the software defined radio architecture.

11 Claims, 7 Drawing Sheets

U.S. PATENT DOCUMENTS

| | | | |
|---|---|---|---|
| 6,308,311 B1 | 10/2001 | Carmichael et al. | |
| 6,311,321 B1 | 10/2001 | Agnihotri et al. | |
| 6,326,806 B1 | 12/2001 | Fallside et al. | |
| 6,336,076 B1 | 1/2002 | Farley et al. | |
| 6,347,395 B1 | 2/2002 | Payne et al. | |
| 6,351,778 B1 | 2/2002 | Orton et al. | |
| 6,353,744 B1* | 3/2002 | Wu et al. | 342/357.09 |
| 6,353,915 B1 | 3/2002 | Deal et al. | |
| 6,377,912 B1 | 4/2002 | Sample et al. | |
| 6,418,494 B1 | 7/2002 | Shatas et al. | |
| 6,421,006 B1 | 7/2002 | Yakos et al. | |
| 6,542,821 B2 | 4/2003 | Krasner | |
| 6,590,521 B1 | 7/2003 | Farley et al. | |
| 6,590,524 B1 | 7/2003 | Farley et al. | |
| 6,590,534 B1 | 7/2003 | Kroll et al. | |
| 6,639,541 B1 | 10/2003 | Quintana et al. | |
| 6,691,301 B2 | 2/2004 | Bowen | |
| 6,720,917 B2 | 4/2004 | Lin et al. | |
| 6,771,625 B1 | 8/2004 | Beal | |
| 6,816,710 B2 | 11/2004 | Krasner | |
| 6,866,232 B1* | 3/2005 | Finney | 244/172.4 |
| 6,909,964 B2 | 6/2005 | Armstrong et al. | |
| 7,017,140 B2 | 3/2006 | Haji-Aghajani et al. | |
| 7,053,827 B2 | 5/2006 | Awata | |
| 7,064,709 B1 | 6/2006 | Weisenburger et al. | |
| 7,142,159 B1* | 11/2006 | Farley | 342/357.06 |
| 7,283,504 B1* | 10/2007 | Elliott | 370/338 |
| 2002/0008540 A1 | 1/2002 | Britton et al. | |
| 2002/0044085 A1* | 4/2002 | Howell et al. | 342/357.06 |
| 2003/0017833 A1* | 1/2003 | Forrester | 455/456 |
| 2003/0102997 A1* | 6/2003 | Levin et al. | 342/357.1 |
| 2004/0045015 A1* | 3/2004 | Haji-Aghajani et al. | 719/328 |
| 2004/0049609 A1 | 3/2004 | Simonson et al. | |
| 2004/0052372 A1* | 3/2004 | Jakoubek | 380/255 |
| 2004/0213334 A1* | 10/2004 | Ledvina et al. | 375/150 |
| 2005/0059427 A1 | 3/2005 | Wallace | |
| 2005/0153730 A1* | 7/2005 | Turetzky et al. | 455/550.1 |
| 2005/0163201 A1 | 7/2005 | Krasner | |
| 2005/0193366 A1 | 9/2005 | Boland et al. | |
| 2006/0040615 A1 | 2/2006 | Mohamadi | |
| 2006/0161314 A1 | 7/2006 | Honmura | |
| 2006/0190285 A1* | 8/2006 | Harris et al. | 705/1 |
| 2007/0155489 A1* | 7/2007 | Beckley et al. | 463/29 |
| 2007/0182630 A1* | 8/2007 | Angus | 342/357.09 |
| 2007/0257831 A1* | 11/2007 | Mathews et al. | 342/357.01 |
| 2008/0303714 A1* | 12/2008 | Ezal et al. | 342/357.12 |

FOREIGN PATENT DOCUMENTS

| | | | |
|---|---|---|---|
| JP | 2005-017260 A * | 1/2005 | |
| WO | 02/05444 A1 | 1/2002 | |
| WO | 02/056481 A2 | 7/2002 | |
| WO | 01/45258 A2 | 6/2004 | |

OTHER PUBLICATIONS bus. (2003). In Webster's New World™ Computer Dictionary. Retrieved Jul. 14, 2008, from http://www.credoreference.com/entry/3482505.*

C. Ying et al., Design and realization of pseudolite receivers based on software defined radio (SDR), Telecommunication Engineering, vol. 46(6), p. 164-166, Dec. 2006.*

C.A. Balanis et al., Smart Antennas for Future Reconfigurable Wireless Communication Networks, Smart Antennas for Future Reconfigurable Wireless Communication Networks. Department of Electrical Engineering, Telecommunications Research Center, Arizona State University, Annual Report, May 2000.*

C. Brinegar et al., Design of an Integrated RF Filter for the Direct Digitization Front End of a Dual GPS/GLONASS Software Radio Receiver, IEEE Radio and Wireless Conference Proceedings, p. 277-280, Aug. 1998.*

D. Akos, Real-Time Software Radio Architectures for GPS Receivers, GPS World, p. 28-33, Jul. 2001.*

N. Gerein et al., Modular GPS Software Radio Architecture, Proceedings of ION GPS, Sep. 2001.*

J. Thor, A High-Performance Real-Time GNSS Software Receiver and its Role in Evaluating Various Commercial Front End ASICs, Proceedings of ION GPS, Sep. 2002.*

English Translation of JP 2005017260 A.*

PCT International Search Report dated Feb. 17, 2004 of International Application No. PCT/US03/27097 filed Aug. 28, 2003.

Armstrong, Rob et al., "Toward a Common Component Architecture for High-Performance Scientific Computing", Proceedings of the 1999 Conference on Distributed Computing, 1999, pp. 1-17 [Online] [retrieved on Nov. 19, 2002] Retrieved from the internet <URL: http://www.unix.mcs.anl.gov/%7Ecurfman/cca/web/cca_paper.html>.

"The Pipelined Frequency Transform", RR Engines Ltd. White Paper, Feb. 20, 2002, pp. 1-14, ref. No. PFT001.Rev2.

Myers, Corey et al., "Rapid Development of Signal Processors and the RASSP Program", Apr. 20, 1994, pp. 1-8, Lockheed Sanders, Inc.

Gardner, W.B. et al., "An Object-Oriented Layered Approach to Interfaces for Hardware/Software Codesign of Embedded Systems", Proceedings of the 31st Hawaii International Conference On System Sciences, Jan. 1998, pp. 197-206, vol. VII, IEEE, Kona, Hawaii.

Spivey, Gary et al., "A Component Architecture for FPGA-Based, DSP System Design", Proceedings of the International Conference on Application Specific Systems, Architectures, and Processors, Jul. 2002, pp. 1-11, San Jose, California.

Saul, J.M., "Hardware/Software Codesign for FPGA-Based Systems", Proceedings of the 32nd Hawaii International Conference On System Sciences, 1999, pp. 1-10, IEEE.

"From Algorithm to Hardware—The Great Tools Disconnect", COTS Journal, Oct. 2001, pp. 48-63.

Lim, Davin et al., "Two Flows for Partial Reconfiguration: Module Based or Small Bit Manipulations", May 17, 2002, pp. 1-23, XAPP290 (v1.0), Pub Xilinx, Inc.

Haji, K. et al., "A Reconfigurable Computing Platform for Detection and Direction Finding of Frequency Hopping Signals", pp. 1-7, Southwest Research Institute.

"Common Component Architecture Forum", CCA Forum, 2002, pp. 1-41, [Online] [Retrieved on Nov. 7, 2002] Retrieved from the internet <URL:www.cca-forum.org>.

PCT Search Report dated Jul. 28, 2008 of Patent Application No. PCT/US2007/018632 filed Aug. 23, 2007.

Ryba, Martin F., Software Defined Navigation Signal Generator, ION GNSS 19th International Technical Meeting of the Satellite Division, Sep. 16-29, 2006, pp. 176-181, Forth Worth, TX.

* cited by examiner

SOFTWARE DEFINED NAVIGATION SIGNAL GENERATOR

RELATED APPLICATIONS

This application is related to commonly assigned U.S. Pat. No. 7,017,140, U.S. patent application Ser. No. 11/385,192, U.S. patent application Ser. No. 11/063,951, and to U.S. patent application Ser. No. 10/650,172. Each of these applications is herein incorporated in its entirety by reference.

FIELD OF THE INVENTION

The present invention relates generally to navigational processing and more particularly to navigation augmentation used for ground, ship, and aircraft based Global Navigational Satellite Systems (GNSS).

BACKGROUND OF THE INVENTION

Reliable and accurate location information continues to be pursued in both commercial and military applications. Long gone are the days of sextants and plotting positions based on stars, or based upon ground based navigation systems. Current navigation aids use satellites to provide highly accurate state information such as position, as well as time related knowledge of direction and speed.

Global Navigational Satellite Systems (GNSS) are navigation and positioning applications and include the Global Positioning System (GPS) as well as the Global Orbiting Navigational Satellite System (GLONASS). For illustrative purposes, the GPS navigational system employs a number of satellites in an orbit about the earth and dispersed in orbital planes at a high altitude around the earth. The control segment consists of tracking stations located around the world, wherein the GPS provides specially coded satellite signals that can be processed in a GPS receiver, enabling the receiver to compute velocity, time and position. The GNSS can be used to determine the position of a user on or near the earth from signals received from the orbiting satellites or space vehicles. The latitude, longitude and even altitude of any point can be calculated from the time of reception of the electromagnetic signal using several satellites to a GNSS receiver.

As has been demonstrated in recent conflicts, many military operations rely upon advanced precision bombing and need a robust Navigation Warfare (NAVWAR) capability. Navigation Warfare can be broadly segmented into three areas: Protection, Prevention, and Preservation. Protection is the maintenance of precise navigation capability in the face of hostile electronic countermeasures. Prevention is the denial of precision navigation to an adversary to reduce his operational capability. Preservation is the maintenance of civil navigation capability outside the designated Area of Operations (AOO). These mission requirements are supported by the three disciplines of Information Warfare: Electronic Protection (EP), Electronic Attack (EA), and Electronic Support (ES). Electronic Attack addresses the Prevention (jamming) mission. Electronic Protection (anti-jam) and Electronic Support (jammer detection) support the Protection mission. Each of these areas requires precise knowledge of targets and friendly assets, and Global Navigational Satellite Systems (GNSS) have been the predominant resource.

The GNSS navigational systems have significant benefits over other positioning and navigational systems because these systems do not rely upon visual, magnetic or other points of reference. However, existing GNSS navigational systems can experience blackout areas or regions when a sufficient number of GNSS satellites are not within line-of-sight of the receiver. Furthermore, GNSS systems are susceptible to jamming by higher power signals.

By way of example, the GPS system is described in further detail herein. In simple terms, GPS systems determine position by processing the time it takes the coded GPS signal to reach the receiver from the particular satellite. The GPS receiver generates a set of codes identical to those codes (e.g., the Y-code or the C/A-code) transmitted by the satellites. In order to calculate the travel time, the receiver determines how far it has to shift its own codes to match the codes transmitted by the satellites. The determined travel times for each satellite are multiplied by the speed of light to determine the distances from the satellites to the receiver. In a typical processing, the GPS receiver receives GPS signals from four or more satellites to enable a satisfactory response. With the information from these GPS satellites, the user can compute the key parameters by solving as independent equations, i.e., the user's location in three physical coordinates (x, y, and z) and time, thus providing the user its own position, velocity and time through known triangulation techniques. Thus, the receiver unit can accurately determine the position in three dimensions (e.g., longitude, latitude, and altitude). Receivers can use a further satellite to accommodate a timing offset between the clocks in the receiver and the clocks in the satellites. Additional satellite measurements can be used to improve the position solution.

In the present configuration, each GPS satellite continuously transmits two spread spectrum, L-band signals: an L1 signal carries the navigation and has a frequency $f_{L1}$ of 1575.42 MHz, and an L2 signal having a frequency $f_{L2}$ of 1227.6 MHz, which is used to measure the ionospheric delay by precise positioning service equipped receivers. Three binary codes shift the L1 and/or L2 carrier phase. The L1 signal from each satellite is modulated by two pseudo-random codes, the coarse acquisition (C/A) code and the precise code (P-code). The P-code is normally encrypted, with the encrypted version of the P-code referred to as the Y-code. The L2 signal from each satellite is modulated by the Y-code. The C/A code is available for non-military uses, while the P-code (Y-code) is reserved for military or other government authorized uses.

In more particular detail, the Coarse Acquisition Code modulates the L1 carrier phase, wherein the C/A code is a repeating 1 MHz Pseudo Random Noise (PRN) Precise Code (P-Code). This noise-like code modulates the L1 carrier signal, "spreading" the spectrum over a 1 MHz bandwidth. The C/A code repeats every 1023 bits (one millisecond). There is a different C/A code/P-Code for each GPS satellite, and GPS satellites are often identified by their P-Code number, the unique identifier for each pseudo-random-noise code. The C/A code that modulates the L1 carrier is the basis for the civil standard positioning service.

The P-Code modulates both the L1 and L2 carrier phases, wherein the P-Code is a very long, about seven days, 10 MHz P-Code. In the Anti-Spoofing (AS) mode of operation, the P-Code is encrypted into the Y-Code. The encrypted Y-Code requires a classified AS Module for each receiver channel and is only used by authorized users with cryptographic keys. The P (Y)-Code is the basis for the precise positioning service (PPS).

The navigation message is typically a 50 Hz signal consisting of data points that describe the GPS satellite orbits, clock corrections, and other system parameters and modulates the L1-C/A code signal and the P(Y) code signals.

The C/A code and P(Y) code are usually code division multiple access (CDMA) systems where a pair of unique signals are assigned to each satellite in the GPS phase of the C/A code or the P(Y) code. The GPS receiver applies correlation to measure timing, and the received signal is correlated with the locally generated replicas of the selected satellite's signal as part of the acquisition. The traditional GPS receiver acquires this phase by continuous sliding, multiplication, and addition. The C/A code is used in civilian GPS receivers and the military GPS receivers use both C/A code and P(Y) code. In general, the military receiver acquires the C/A code and transfers this timing to P(Y) code for tracking.

There are several sources of errors for GPS, and two signals are typically used to reduce/eliminate errors that arise due to refraction of the transmitted signal, such as by the ionosphere. The L1 signal is typically Binary Phase Shift Keying (BPSK) modulated by two pseudorandom codes in phase quadrature. The phase code modulation is ideally suited to measuring time or time delay. The time delay correlates to a measure of range while the difference in phase measurements taken at fixed time intervals correlates to a measure of frequency. The phase code modulation is compared (correlated) with the expected phase or replica of the phase code modulation. Typical phase code modulations include both BPSK and Binary Frequency-Shift Keying (BFSK).

As is well known, a pseudorandom code sequence is a series of numbers that are random, and using a binary pseudorandom code to modulate the phase of a carrier signal produces a suppressed carrier spread spectrum signal. The L2 signal is BPSK modulated by only one of the pseudorandom codes. The pseudorandom codes permit simultaneous use of a number of GPS satellite signals to provide dynamic position information. A signal transmitted by a particular GPS satellite is acquired by generating and correlating the pseudorandom code for that satellite. Some of the pseudorandom codes are known and are generated or stored in commercially available GPS receivers. Other pseudorandom codes are not publicly known such as for military or certain private applications.

There are situations where a GPS receiver may not have access to a sufficient number of satellites to properly process the position data. A system that augments GPS satellite measurements allowing a GPS receiver to function properly is called a pseudolite. Pseduolites are also used in other GNSS implementations. Terrestrial based pseudolites include ground, ship and aircraft based locations with GPS transmitters that are used to transmit the L1 and L2 signals. The pseudolites can also increase the jamming levels at which GPS acquisition and navigation can be achieved by providing much higher signal power levels. Therefore, a potential jammer would need to transmit much higher signal levels to jam the pseudolite signals. Existing ground based pseudolite navigation systems are based on a fixed location for each pseudolite transmitter. Pseduolites expand the capabilities of certain GPS receivers and allow greater accuracy. Pseudolites that are not in a fixed location have been used, however this introduces greater complexity and requires corrections and further processing. For example, a ranging reference signal can be time-slotted and modulated with correction data and broadcast from a ground-based transmitter synchronized to GPS time. A second receiver is typically required at the non-fixed location to process the ground station signals broadcast at the second frequency. Several techniques have been used for approach and landing on aircraft carriers, which illustrates one example involving two moving assets that require precise state information.

In some cases, pseudolites broadcast a signal at the same frequency as GPS satellites operate such that the receiver can process this measurement as though it were another satellite. However, a pseudolite with this signal format will act as a jammer to users operating near the transmitter, thereby preventing that receiver from receiving clear signals from the GPS satellites.

If a military GPS receiver is under a hostile environment and exposed to a strong jamming threat, the less vulnerable direct P(Y) acquisition becomes necessary. Intentional and unintentional jamming of GPS satellite C/A code and P(Y) code signals prevents the signal acquisition and tracking by GPS receivers. The relatively low power of GPS satellite signals facilitates the ease of such jamming, thus increasing the need for better pseudolites.

An impediment to the implementation of pseudolites in certain areas, such as military applications, is that dedicated circuits are used to generate the higher power pseudolite signals and maintain the quality of the signal with the satellites. Dedicated or custom hardware is both expensive and incurs logistics and operational problems. Products in this category are referred to in a general sense as "High Demand/Low Density Assets" and are undesirable.

Furthermore, GPS signal requirements include having a frequency reference at a precise multiple of 10.23 MHz (fundamental frequency of the GPS satellites). Pseudolites generally lack high quality frequency references and rely on adjustment mechanisms such as described in U.S. Pat. No. 6,590,524. The narrow and specific requirements are counter to the principles associated with having flexible reusable multi-mission systems.

A system of reusable and flexible components is especially useful for military implementations. In the past, software was designed specifically for a single application and there would be multiple applications in which the majority of the code was similar. As discussed herein, differences in language and architecture prevented different functionalities from being reused. Newly developed applications also typically have a relatively higher risk of failure and require more testing and debugging.

The use of object oriented, distributed framework based software systems has led to improvement in the modularization of software, but also has somewhat increased the complexity of the hardware. The heterogeneity of the distributed computing platform means that the interfaces with devices such as field programmable gate arrays (FPGA) and similar devices became increasingly complex. Interfaces between processors eat into valuable computing time and retard calculations. In applications that require real time processing, the general purpose processors are not satisfactory. In addition, the power requirements generally become excessive.

Layered or component-based systems have a thin common layer or component base class that is used in the development of all software modules. Each of the major capabilities of the system is represented by at least one module or component. These modules or components are thus "wrapped" in the thin common layer. Independent components are developed, tested, and packaged independently of each other, and while operating have no knowledge of their environment, since all input/output is constrained to interface ports connected from the outside. Run time discoverable parameter ports control specific behavior. Software components thus allow reuse by performing a particular function and providing an appropriate interface with a larger system. Each component would ideally be autonomous regarding its particular functionality. This autonomy would allow changes to be made with individual components without disturbing the configuration of the entire system. Relating the various quasi-autonomous components to each other results in a high degree of complexity in communication and synchronization code.

Although such systems have extraordinary benefits, the implementation is exceedingly difficult. Distributed processing systems of general purpose or special purpose computers, use a framework of common electrical, physical, and logical interfaces to specify and enforce compatible interfaces between software programs that perform discretely defined processing (components). In a distributed processing system of general purpose or special purpose computers, signal and specialized data processing can consume more processing time and resources than can be provided in a processor. To obtain more processing per volume or per cost, the known devices use specialized digital hardware such as FPGA's, or special purpose integrated circuits. These mechanisms do not provide a common, controllable interface that can interface in a common way to other software-based signal and data processing components in the distributed system. Customarily, large computations of partitionable problems with time constraints are performed using distributed processing.

In order to achieve real time processing, field programmable gate arrays (FPGAs) are typically employed. The applications coded in hardware design language (HDL) running on FPGAs achieve orders of magnitude speed improvements over their software counterparts running on general purpose computers. The reconfigurability of the FPGAs provides adaptive processing, and high density FPGAs currently accommodate multiple complex applications running in parallel. But, there are significant problems in integrating with multiple applications, which run on FPGAs and boards manufactured by the various manufacturers into a coherent form.

There is a significant desire for speed and higher processing power particularly in fields such as GNSS receivers and GNSS pseudolites that can process navigation data from satellites and provide faster and more accurate state information. The faster the computational algorithms and digital signal processing functions are processed the faster the system can respond. Unfortunately, the core functions are typically designed and implemented for each specific task without any consideration of code reuse or interoperability between cores or both which results in expensive modification costs and inefficiency.

Therefore, what is needed is a system and technique for implementing a software defined navigation signal generator. The framework should be robust and allow customizable components to be easily instantiated and deployed. The underlying software should provide flexible pseudolite waveforms with sufficient characteristics to enable a broad range of navigation related applications.

SUMMARY OF THE INVENTION

Accordingly it is a general object of the present invention to provide a novel and useful system and associated methods that can solve the problems described herein.

An embodiment of the invention is a system for software defined radio navigation, comprising a framework having a hardware independent interface and a hardware dependent interface and communicating with at least one bus. Such a framework could be implemented within a Field Programmable Device (FPD). There is a processing section coupled to the framework and processing a set of input navigation data into a set of processed navigation data, wherein the processing section includes at least one software defined radio component, and wherein the component is hardware independent. The component could be, for example, instantiated on the FPD. A transmitter section is coupled to the framework, transmitting the processed navigation data.

A further feature of the system comprises a receiver section coupled to the framework, receiving the input navigation data. While the system can be any navigation signal generator, in one embodiment the system is a pseudolite.

The software defined radio component can be selected from at least one of the group consisting of: red side processing, infosec, black side processing, and combiner.

As described, the system can be implemented in an object-oriented manner, wherein each component is comprised of a core application and a respective component virtual interface, wherein the core and the component virtual interface are hardware independent. There is a target platform interface interacting with the component, wherein the target platform interface is hardware specific and binds the component to a Field Programmable Device (FPD), and wherein the target platform interface is coupled to the framework manager.

Another embodiment comprises a combiner providing phase, frequency and time offset compensation. The combiner can also provide at least one multipath.

One embodiment includes a navigation signal generator, comprising a receiver section receiving a plurality of input navigation signals, wherein the receiver section comprises a plurality of receiver antenna elements and a global navigational satellite system (GNSS) receiver section. There is a processing section processing the input navigation signals, wherein the processing section comprises a set of software defined radio processing elements and a combiner implemented in a field programmable device. The processing section generates a summed single output navigation signal, and a transmitter section with a plurality of transmitter antenna elements transmits the output navigation signal.

A variation of includes where the transmitter antenna elements and the receiver antenna elements are the same and can be switchably coupled. Another aspect includes a bridging interface about the software defined radio processing elements.

One embodiment of the invention is a method for combining a plurality of navigation input signals into a navigation output, comprising synchronizing the plurality of navigation input signals, resampling the navigation input signals to a common output rate, adjusting a carrier frequency by applying a Doppler shift, scaling the navigation signals, modulating the navigation signals, and summing the navigation signals into the navigation output signal. The summing process may include an additional global offset. In addition, the resampling can be done at any arbitrary rate. The non-realtime buffering is a further feature.

The summing can be represented according to the following:

$$Y_i(n) = S_i \cdot X_i \left[ \frac{t_0 - t_{i0} - \tau_i + n\Delta t}{\Delta t_i \left(1 + \frac{\Delta f_i}{f_c}\right)} \right] \cdot e^{j2\pi(n\Delta t \Delta f_i + \phi_i)}$$

wherein $S_i$ represents scale factor; $X_i$ represents the input signal stream; $t_{i0}$ is the start time for the first sample of the input signal; $t_0$ is the start time for the output processing interval; $\Delta t$ is the output sampling interval; $\Delta t_i$ is the input sampling interval for that stream; $\tau_i$ is the total propagation delay to be applied to this signal component; $\Delta f_i$ is the Doppler shift to be applied to this signal component; $f_c$ is the carrier frequency; and $\phi_i$ is the propagation phase shift to be applied to the first sample.

A further step includes adjusting at least one of carrier phase, carrier frequency, and time on the output signal stream. In addition, the processing can be faster than real time.

One embodiment of the present invention relates to navigational and positioning systems, and more particularly to a navigation augmentation system which allows navigation when satellite signals are too weak or are unavailable. The present invention also relates to pseudolite navigation systems used to augment navigation with a current GNSS. Although the various descriptions relate to GPS, this is only for illustrative purposes and the present invention applies to any GNSS system.

A number of architectures employing the navigational systems and processing are within the scope of the present invention. The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

The methods and embodiments of software defined navigation transmitters disclosed herein that enable improved navigational systems that are more flexible and cost effective. Please note that figures and accompanying descriptions are only a few of the possible embodiments and are presented to demonstrate features of the invention.

One embodiment of the present invention is a navigation signal generator system on a software defined radio architecture or framework. As used herein, unless otherwise defined, the term platform refers to the physical assets which may include firmware and software elements. The term framework and architecture refers to the software and firmware objects or modules used therein. The term system refers to the combination of the framework and platform. The framework detailed herein provides a standardized object-oriented means for developing and managing RF signal processing functions. This framework's ability to dynamically reallocate functions lends its use to numerous communications, signals intelligence, and information operation missions. Signal processing steps can be allocated among numerous processors on a network; they can also be deployed, for example, in Field Programmable Gate Arrays (FPGAs). The framework provides standardized interfaces that support easy insertion of new COTS hardware, and ready adaptation of the payload to various host platforms.

Figure 1:
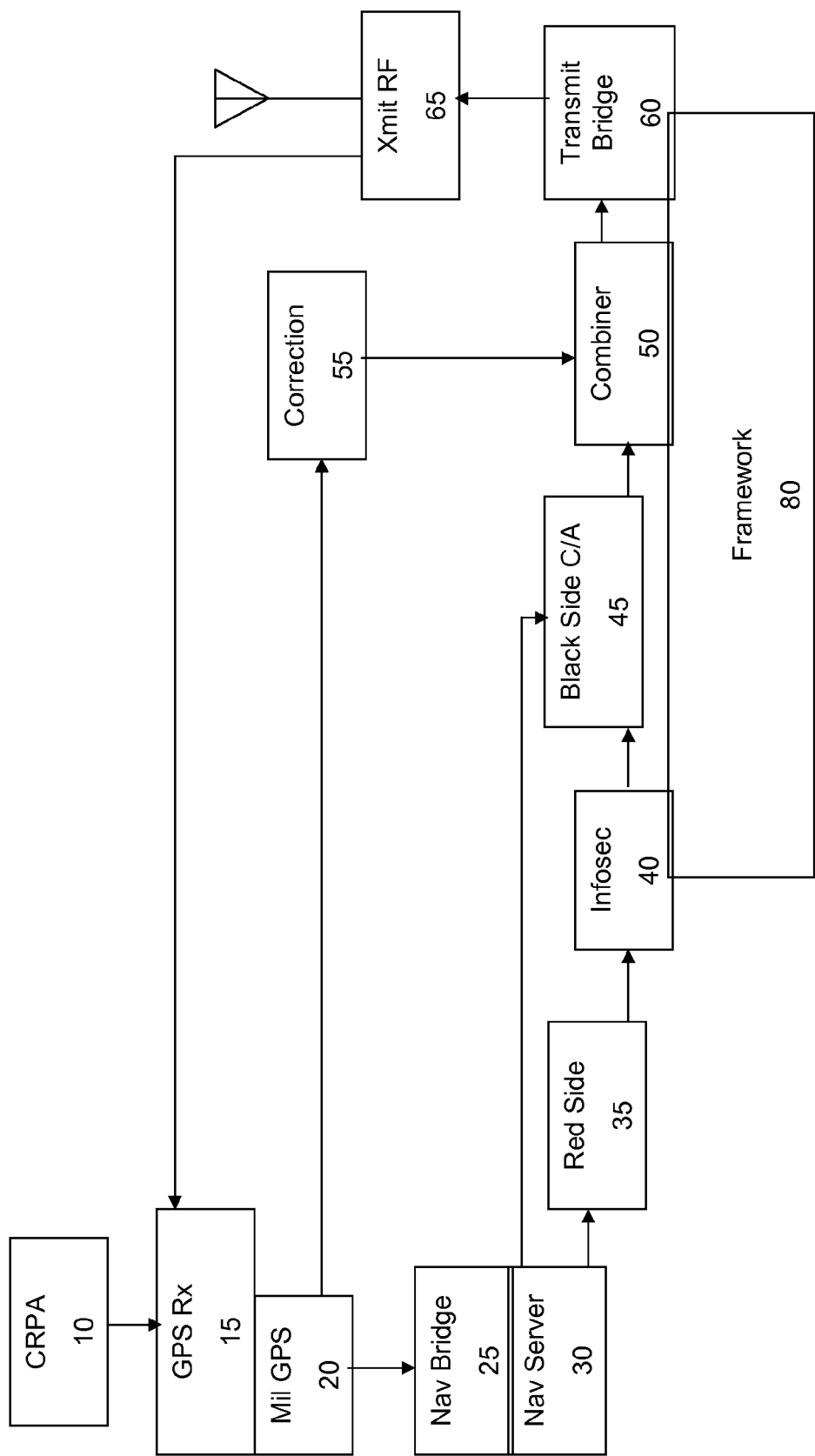
FIG. 1 is a top level diagrammatic perspective of a navigation augmentation system according to one embodiment of the invention.

Referring to FIG. 1, an overall system of a navigation signal generator, such as a pseudolite, in a scalable object oriented component and framework architecture is depicted. According to this embodiment, there is a Controlled Reception Pattern Antenna (CRPA) 10 that couples to the GPS receiver 15. The CRPA is a multi-element antenna that is typically used to receive GPS signals and route them to GPS receivers in certain applications providing highly accurate, all weather navigation and timing information that allows, for example, aircraft to follow more precise flight patterns, rendezvous, and weapons delivery. The CRPA 10 also provides the capability to receive the GPS signal in a jamming environment. As described herein, the combination of the CRPA and the GPS receiver form a high performance navigation system with anti-jam features.

Coupled to the GPS receiver 15 is a MilGPS 20 that provides platform information for the GPS navigation system and serves as a bridge between the platform and the navigation service system for data parsing. The MilGPS 20 provides the platform-supplied inertial measurement and in combination with the CRPA 10 and the GPS receiver 15, together provides highly accuracy state information (time, position, velocity, orientation, etc. . . . ) for subsequent processing. The MilGPS 20 not only provides the state information to the navigation service components 25, 30 but also to the correction task module 55. While the CRPA 10 and GPS receiver 15 are generally hardware elements, the MilGPS 20 tends to be a software component.

The navigation service sections are instantiated in the framework and include the navigational bridge 25 and the navigation server 30. The navigation server 30 is coupled to the red side processing section 35 and to the black side C/A processing section 45. The terms red side processing section and black side processing section refer to the red and black side nomenclature for Software Defined Radio (SDR). For illustrative purposes, the red side processing section and black side processing section will be referenced herein as red side pseudolite and black side pseudolite, however this is for illustrative purposes as the present invention is not limited to pseudolites. The red side pseudolite 35 generates the cleartext military signal stream which essentially structures the data into an appropriate format. This P-code signal stream, typically at 10.23 Mbps, from the red pseudolite is encrypted by the Infosec 40. In one embodiment the output of the Infosec 40 is the Y-code at 10.23 Mbps while in other implementations the output could be M-code or other similar protected signal. The encrypted data from the Infosec 40 is then communicated to the black side C/A pseudolite 45. The black side pseudolite 45 can add unencrypted signals, such as current C/A codes used for acquisition, and also couples to the navigation server 30.

The Combiner 50 takes one or more input streams from the black side C/A pseudolite 45 and adjusts them as necessary with corrections from the correction task module 55 for transmission. In one embodiment the combiner 50 takes one or more input signal streams with arbitrary bit rates and re-samples them to the rate selected by the platform dependent transmit bridge section. In addition to resampling, the combiner 50 also applies carrier phase, carrier frequency, and temporal (time shift) adjustments on the signal stream either on a per-signal basis or globally. These adjustments from the correction task module 55 can be used to implement the clock correction function such as described in U.S. Pat. No. 6,590,534, which is herein incorporated by reference for all purposes. In this embodiment, the correction function executed by the correction task module 55 interprets correction data generated by the GPS receiver 15 as collected by the MilGPS 20. The correction task module 55 also generates the parameters for the Combiners 50 to adjust the pseudolite signal to maintain synchronization with the satellites. The framework 80 provides the supervisory command and control functionality of the various components.

The combiner 50 is coupled to the transmit bridge 60 that provides the interface from the framework platform 80 and aids in the L band conversion and processing for frequency shifts related to the quantitization of the hardware upconverter.

The L band signals are then amplified and transmitted by the RF transmitter section 65. Optional filtering is within the scope of this section. In a pseudolite implementation, the transmitted signal can be the augmented state information that is being communicated to a GPS receiver, however the present invention is not limited to pseudolite applications. The transmitted signal is also coupled back to the GPS receiver 15.

According to one embodiment, the present invention is a navigation signal generator system on a software defined radio framework that provides a standardized object-oriented means for developing and managing signal processing functions. The framework or architecture provides the ability to dynamically reallocate functions allowing numerous communications, signals intelligence, and information warfare missions that may be required under a single platform and co-exist with other frameworks in a heterogeneous environment.

For illustrative purposes, the Adaptive Joint C4ISR Node (AJCN) is an example of a SDR platform under which the framework resides, wherein the framework supports the GPS augmentation functions such as a military pseudolite or other navigation signal generator. The present invention allows flexibility to various missions, including the stringent signal timing and control requirements. While embodiments of the invention are described with the AJCN military pseudolite the present invention is not limited to this platform, nor is it limited to the described framework. In addition, while the example of pseudolites is used to explain certain functionality, the present invention applies to other navigation related applications.

As described herein, the system framework according to one embodiment of the present invention employs the framework/architecture which is described in commonly assigned patent applications U.S. patent Ser. No. 11/063,951 entitled "Object-Oriented Component and Framework Architecture for Signal Processing"; U.S. application Ser. No. 10/650,172 entitled "Mechanism for Integrating Programmable Devices into Software Based Frameworks for Distributed Computing; U.S. Pat. No. 7,017,140 entitled "Common Interface Framework for Developing Field Programmable Device Based Applications Independent of Target Circuit Board; and U.S. application Ser. No. 11/385,192 entitled "Common Interface Framework for Developing Field Programmable Device Based Applications Independent of Target Circuit Board". All of these applications are incorporated by reference for all purposes.

However, it should be understood that the present invention is not constrained to the system architecture described herein and that any of the software definable platforms may be used with the present invention. For example, the Joint Tactical Radio System (JTRS) Software Communication Architecture (SCA) provides another framework for creating modules, although less flexible in supporting independent dynamic allocation of transmitted/received assets. Both the JTRS SCA framework and the framework detailed herein can be deployed and cooperatively operate under a single platform.

Figure 2:
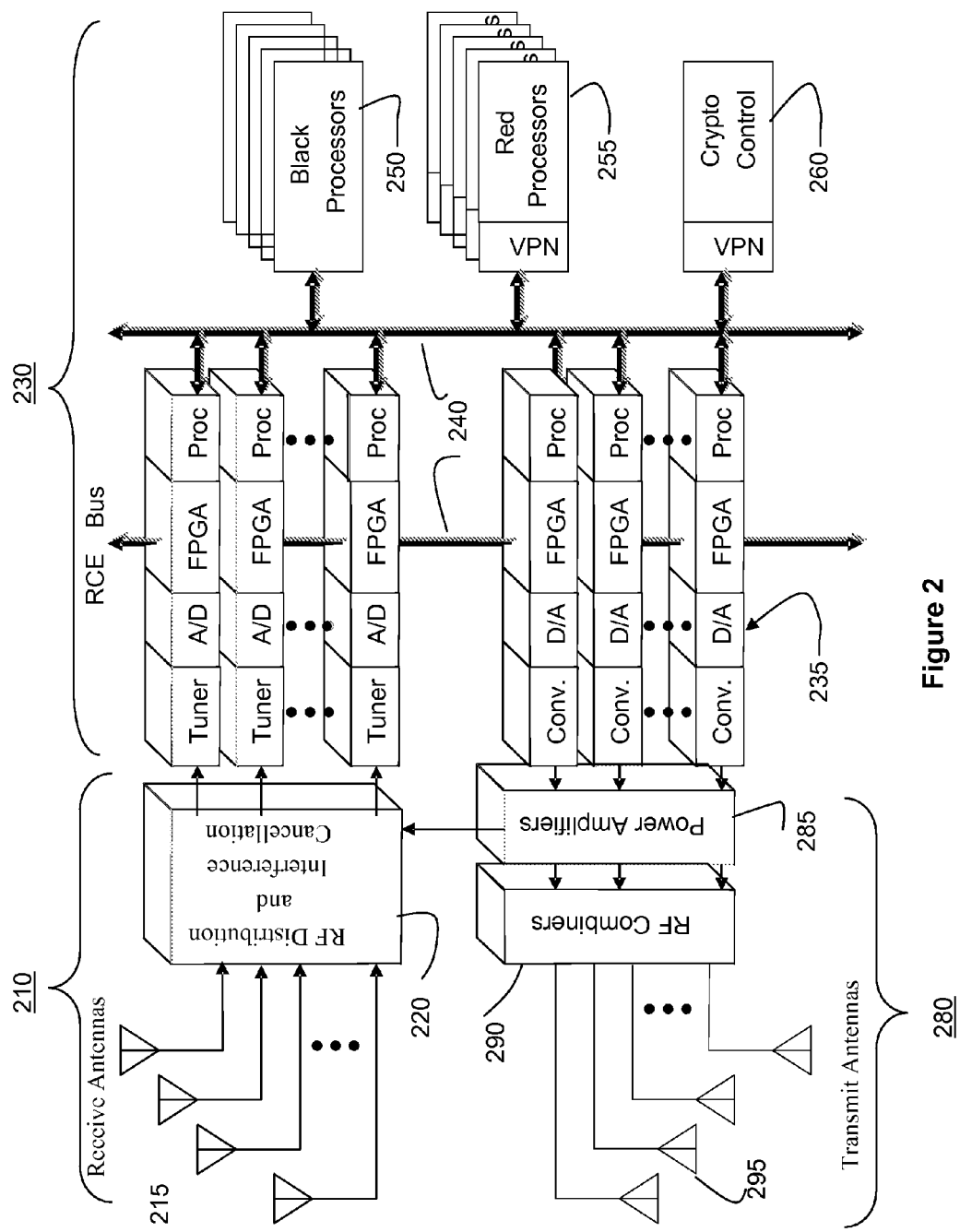
FIG. 2 is a perspective view of the navigation augmentation system in a framework according to one embodiment of the invention.

Referring to FIG. 2, various elements from FIG. 1 are coupled in a manner that illustrates the deployment on a platform including the physical assets. There is a receiver section 210 that consists of a plurality of antenna elements 215 coupled to an RF receiver section 220. The RF receiver section 220 includes signal processing functions that can include RF distribution, amplification, and filtering/interference cancellation. Most of these tend to be RF processing functions and accomplished in hardware.

Another embodiment of the present invention is a fixed position system wherein the navigation data is stale and there is no reception and RF processing. The stale data is processed in a similar fashion as detailed herein although certain correction factors can be applied.

The RF output from the Receiver Section 210 is coupled to various processing modules 235 that perform typical functions such as downconversion, analog-to-digital conversion, and filtering. There are typically general purpose processors (GPPs), reconfigurable compute engines (RCEs) such as FPGAs, RF tuners and exciters and security mechanisms such as Virtual Private Network (VPN). The combiner detailed herein is one of the components that is instantiated on an FPGA.

The digital data stream is then processed as described herein employs various components that process the data into required format and extract the required information. There are various busses 240 that allow for the data to easily flow within the receiver section and between the various components. The black processors 250, red processors 255 and crypto control/infosec 260 are coupled via a bus 240 and the data can be processed. Post-processing functions are also performed to make the data appropriate for transmission, and may include digital-to-analog conversion and upconverting to the RF frequency.

The RF processed signals are then processed by the RF transmitter section 280. This section 280 includes features that may include amplification by power amplifiers 285 and adaptive multicouplers for combining signals in an RF combiner section 290 prior to transmitting the signals by the antennas 295.

The present framework enables the development and characterization of low-level and high-level signal processing components and modules required for the navigation signal generator. As described herein certain infrastructure elements that interact with the task can be developed such as DSP algorithms from C++ software to an FPGA implementation executed in the system framework thereby achieving the necessary real time computational throughput. Signal processing steps can be allocated among numerous processors on a network; they can also be deployed in Field Programmable Gate Arrays (FPGAs). Both the software and FPGA frameworks provide standardized interfaces that support easy insertion of new COTS hardware, and ready adaptation of the payload to various host platforms As noted herein, an embodiment of the present invention is a mechanism for making a component independent of the hardware, and in particular, of instantiating components for the navigation system described herein. Thus, one implementation of the present invention is to develop a framework for signal generators such as pseudolites where the application is developed independent of the chip or board, and any dependency is built in as part of the framework. The description herein describes one form of Field Programmable Devices (FPDs), namely Field Programmable Gate Arrays (FPGAs) in order to describe one embodiment of the invention. However, the description is equally applicable to other FPDs such as Simple Programmable Logic Devices (SPLDs), and Complex Programmable Logic Devices (CPLDs). Likewise, the use of VHDL as a core application is merely used for illustrative purposes as an example of a hardware design language (HDL) and other design languages are within the scope of the invention.

Figure 6:
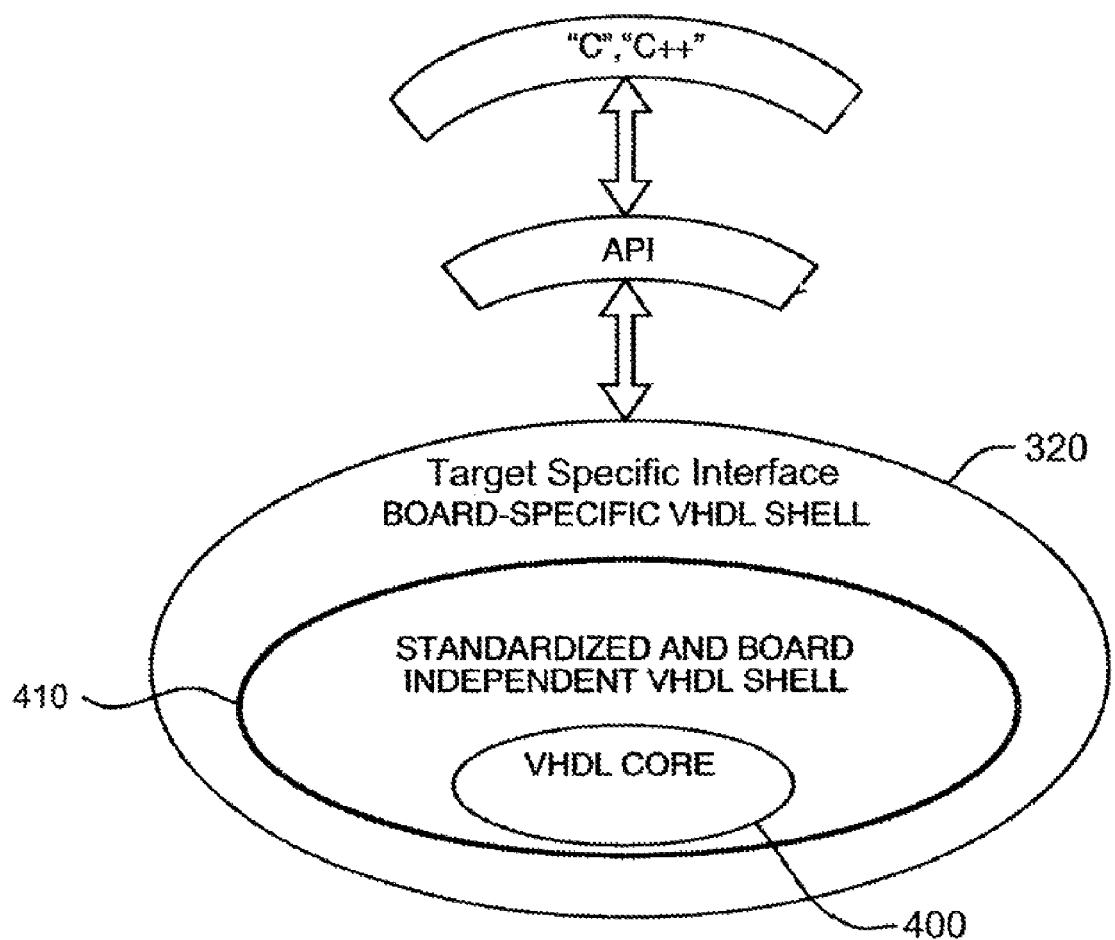
FIG. 6 is a flow chart showing hardware dependant and hardware independent interfaces of a framework according to one embodiment of the invention.

As illustrated in FIG. 6 and described in commonly assigned application Ser. No. 11/385,192, and issued U.S. Pat. No. 7,017,140, there is a framework 80 where the HDL core 400 is developed independent of chip or board. The dependency is built in as part of the framework 80 with coupling between the various elements. The HDL core application, may be written in a language such as VHDL or Verilog, and is specified as independent of the target hardware. A component virtual interface (CVI) 410 with a standard look, feel and form factor is a standardized and hardware-independent (board independent and FPD independent) shell that interfaces with the HDL core. A target platform interface (TPI) 320 is a board specific wrapper that interacts with the component virtual interface. In one of the embodiments, these elements are implemented in a FPD such as an FPGA.

Figure 3:
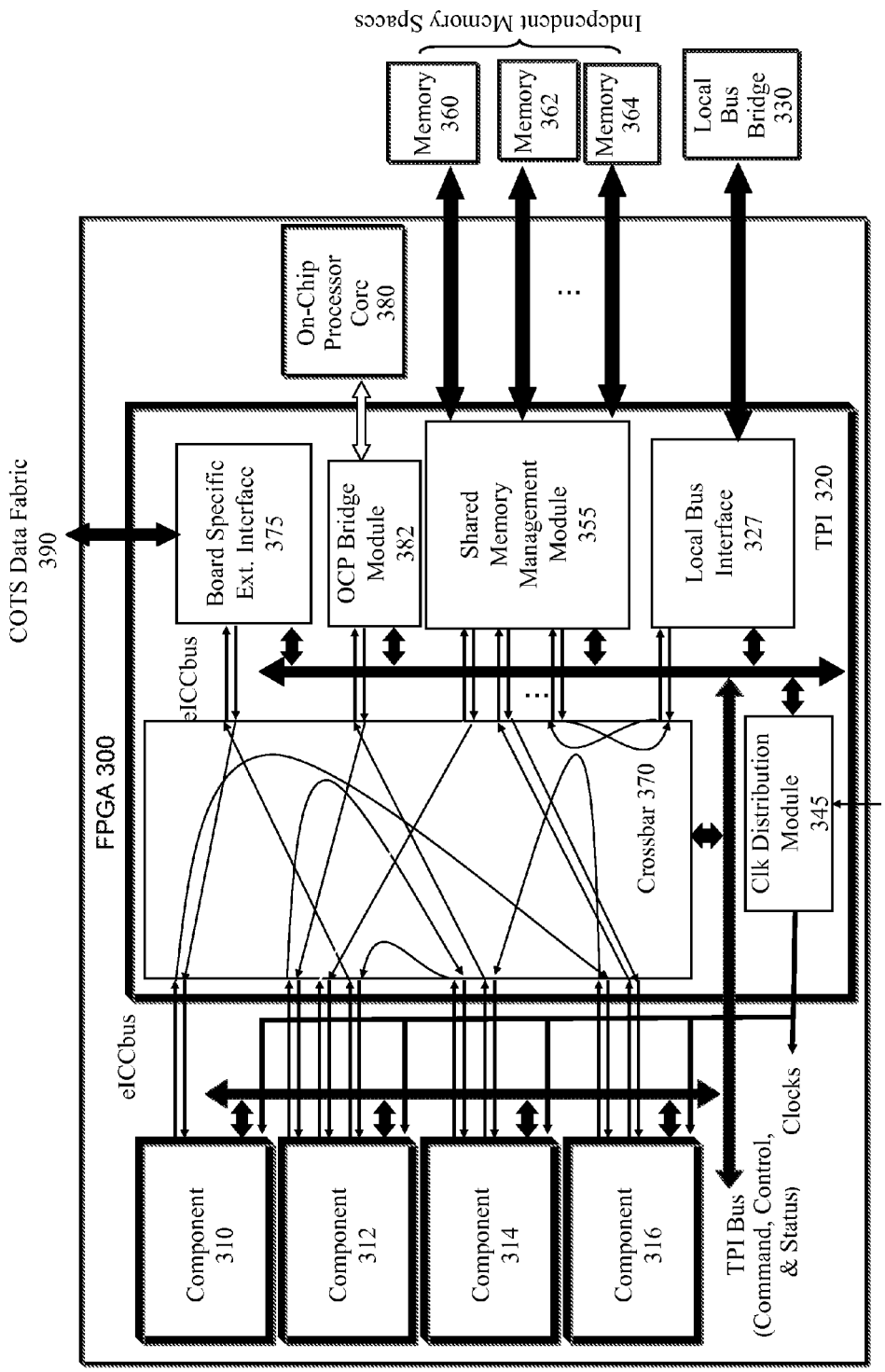
FIG. 3 is a diagrammatic perspective showing the elements and connections for multiple components coupled to the Target Platform Interface (TPI) configured in accordance with one embodiment of the present invention.

Referring to FIG. 3, a depiction of multiple components 310, 312, 314, 316 communicatively coupled to the TPI 320 via the crossbar 370 is depicted wherein the components 310, 312, 314, 316 can be the pseudolite components described herein. The architecture of the present invention is built on the concept of making a component with a core application independent of the hardware. Thus, while the TPI 320 is board specific, when a new board is introduced, it is only necessary to alter the TPI 320 as the application has no binding to the physical chip assets and CVI also has no knowledge of the chip resources, as it is only the TPI 320 that has knowledge of the physical resources of the chip. The TPI 320 then allows the rest of the system to utilize the resources of the chip.

The TPI 320 provides access to the framework manager and operating system via the local bus interface 327 on the TPI and the external local bus bridge 330 thereby allowing dynamic control of the various chips by the operating system through the TPI. The TPI 320 incorporates the local bus interface 427 which may couple to an external local bus bridge 330 outside the FPD 300. The local bus interface 327 talks to the bridge 330 and generates TPI data bus and control bus information that goes to the TPI 320 and also other chips. The bridge 330 provides the interface to from the system bus to the various FPD's.

The local bus interface 327 is board specific and developed separately for each board and requires certain information, such as chip I/O and resources around each chip, and specific handshake details of the Bridge chip 330 bridging the board to the backplane such as PCI or VME. The TPI off-chip signals are specifically defined for each board with pin mapping for different FPD boards.

Core functions within the components 310, 312, 314, 316 can require memory, internally, externally or both for any particular application. On-chip memory requirements are typically satisfied by the interface between the core and the CVI local memory interface module as described herein, which is used for smaller memory requirements.

The shared memory management module 355 of the TPI 320 can also manage access to various on-chip memory as well as off-chip or external memory 360, 362, 364 which are independent memory spaces. Thus, some algorithms require some small memory that can be provided on-chip as detailed herein. Larger memory requirements can be handled by the off-chip memory via the shared memory management module 355.

Even larger memory requirements can employ the shared memory management module 355 to utilize external independent memory spaces 360, 362, 364. Larger memory requirements would be handled by the external memory banks 360, 362, 364 through the shared memory management module 355 through the crossbar and to the appropriate component 310, 312, 314, 316. The external memory engine 355 bridges the core external memory access requests. The external memory module 355 also supports the directed and automatic addressing modes.

There can be an on-chip processor (OCP) core 380 that can be any form of general purpose processor residing on the FPD 300. The on-chip processor core 380 communicates with the TPI 320 via the on-chip bridge module 382 that enables access to the processor 380. The OCP Bridge Module at one end adheres to the communication IO protocol of the OCP and at the other to the eICCbus, as well as being connected to the Local bus Interface 327 for control and status. Thus the OCP can be running software applications that source or sink data to the Components 310, 312, 314, and or 316.

In this embodiment, the board specific external interface 375 communicates with a data fabric 390. The data fabric 390 is a board specific COTS serial or parallel data transport mechanism such as FPDP, Serial Rapid IO, Ethernet, or possibly a non-standard data transport, which allows high speed point to point communications between boards external to the system bus, which is usually used for control functions. When multiple same-kind data transports are interconnected, they form a data fabric.

The FPD technology with its ever increasing size, density, clock rate, and on-chip features has made it possible to build sophisticated systems on a chip using COTS and internally developed cores. To facilitate reuse of these cores one embodiment follows a standard connectivity model. The architecture defines the methodology to design reusable cores as Components which can be readily mixed and matched to form a more complex system. One part of this methodology is the use of enhanced Inter-Component Communication Bus. A system built of Components interconnected by the eICCbus via a Crossbar Switch is described herein.

Figure 4A:
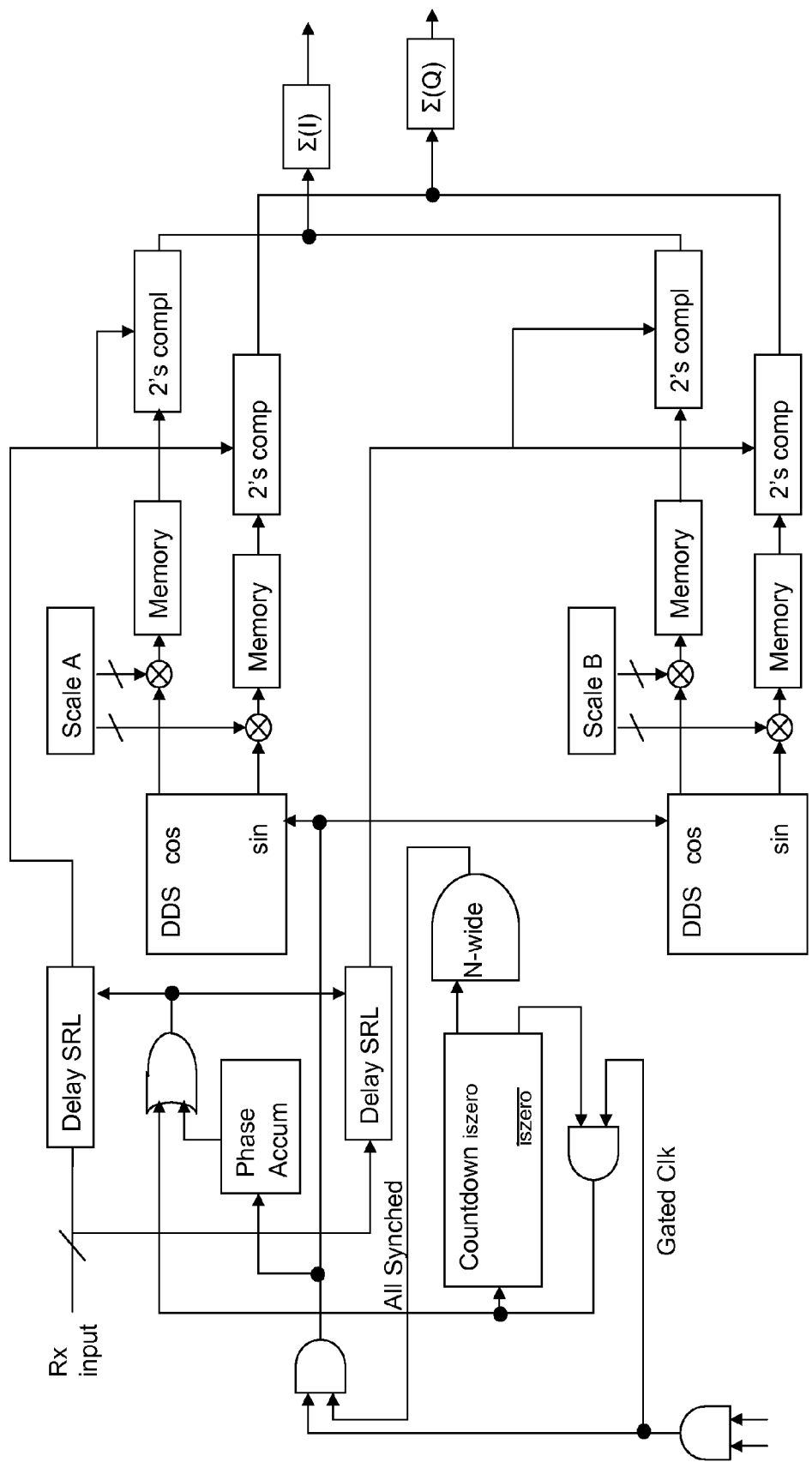
FIG. 4a is a diagrammatic perspective of the combiner according to one embodiment of the invention.
Figure 5:
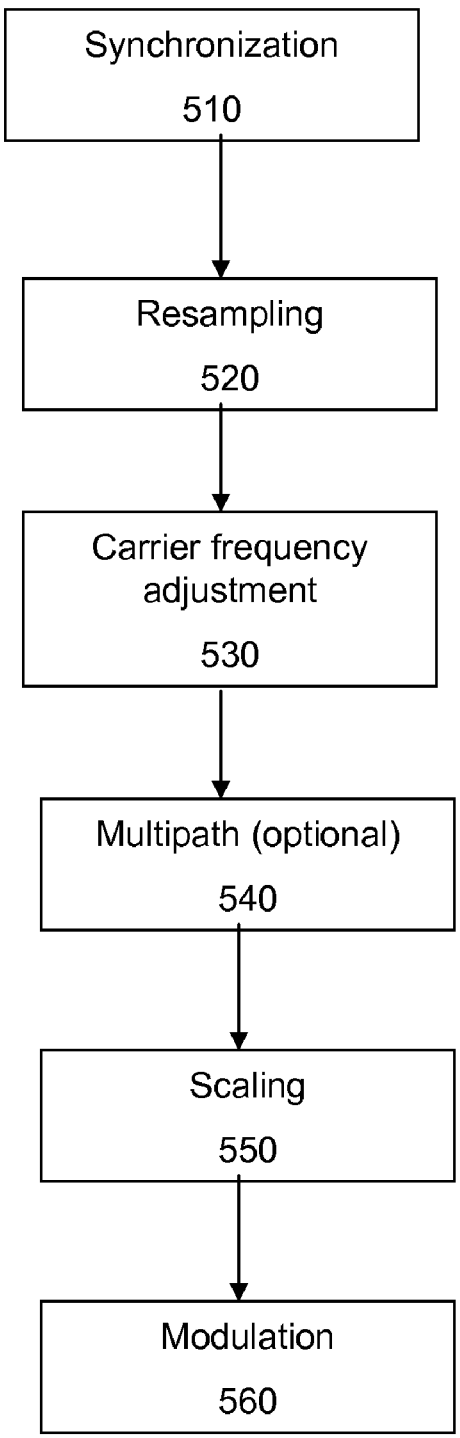
FIG. 5 is a flow chart showing navigation processing according to one embodiment of the invention.

The Combiner is detailed herein, where FIG. 4*a* shows a combiner block diagram and FIG. 5 shows the combiner processing. The combiner component can operate either in software-only mode where all signal processing is done in the host computer or in a framework mode. In the framework mode, the high-rate input streams and all digital signal processing are performed in an associated FPGA core, called the Combiner core. The Combiner design in this embodiment involves a number of design tradeoffs and there are numerous other variations.

In general, the Combiner component takes multiple input streams and adjusts them as necessary into a single signal for transmission by a baseband modulator. One unique aspect of this combiner is that multiple output components can be specified from the same input signal, wherein each output will have unique scale, delay, Doppler, and phase terms applied.

Figure 4B:
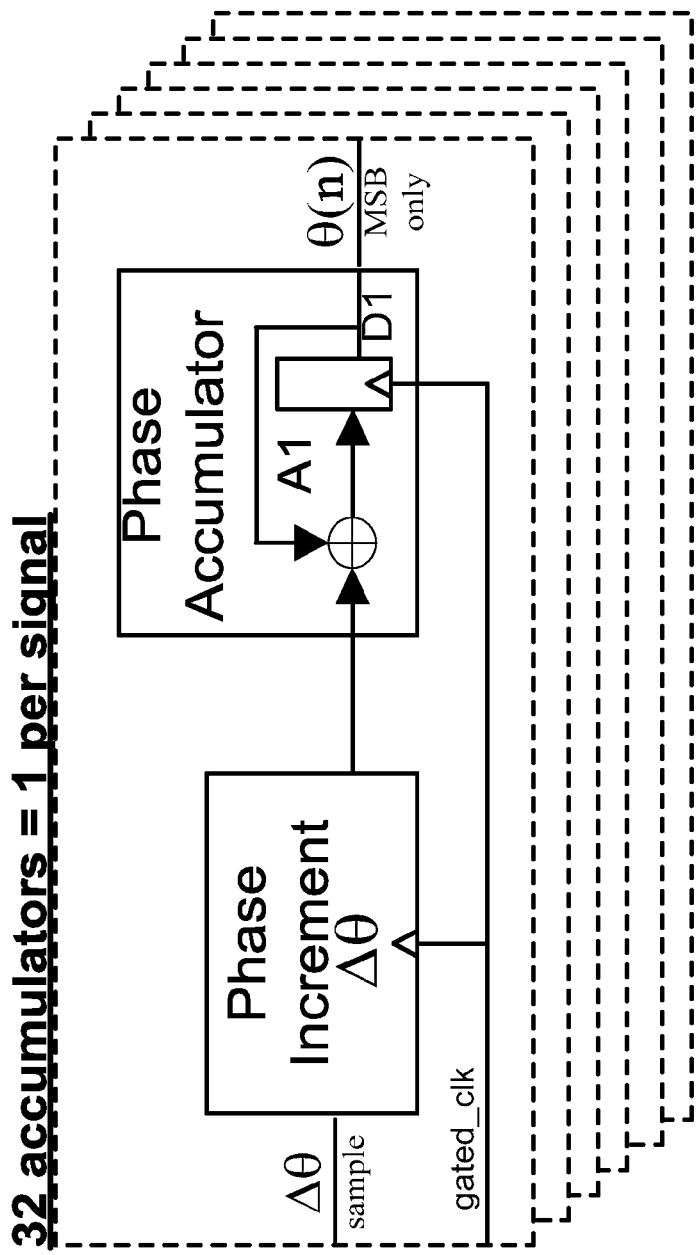
FIG. 4b is a perspective view of the accumulator that performs the resampling function of the combiner according to one embodiment of the invention.

The input Rx stream is clocked in by the sampling clock section. Samples at a later point in time (higher array index) than the current position are not typically available. A sliding buffer of samples can be kept in a delay line. By way of illustration, if the current size of that delay line is 128 bits, by setting a parameter, the output of the shift register can be any of the 128 samples. The size can be adjusted depending upon the design criteria For the Combiner core, a typical FPGA does not have large quantities of random access memory at its disposal, and memory fetch operations are probably the biggest speed bottleneck for processing at high speed on a general purpose processor. Thus, to accommodate the mixed signal rates and the need to make multiple copies at time varying delays of a given input signal, there are several approaches. In this embodiment, each input is given its own clock, driven by an arbitrary frequency digital clock module provided by an accumulator. Each input is routed to both a "prompt" wire and a delay shift register which can accommodate multiple input samples. FIG. 4b illustrates a phase accumulator for resampling according to one embodiment of the present invention.

To get the correct sample at the input port at the start of processing, a "pre-fetch" capability is implemented. It is assumed the code generation core has constraints as to what epoch it starts generating its bit stream. For example, the current implementation of the C/A and P code generators must start on a navigation bit boundary (20 ms granularity). The countdown counter at the beginning holds main processing for a necessary number of clock cycles to fetch the requisite number of data samples from the input port. Once all channels have counted down to zero, the "ALL SYNCHED" flag will be raised and normal processing can commence. The 'Gated Clk' ANDed with the 'All Synched' also clocks the output data and the Countdown for samples output, which toggles Start false when done. The 'All Synched' also drives the output Data Valid.

Thus in this embodiment, the synchronization logic is reversed, as the latest needed sample at the start of the processing block determines what sample should be present at the input port at the start of the processing cycle. All signal components referring to an earlier sample (e.g., a multipath term that is delayed from the core) share the same input stream but pick a nonzero sample index from the SRL. Note that this limits the resolution of multipath components to one input chip. Depending on space constraints, sub-chip indexing can be implemented. Once processing starts, all outputs derived from one input pull data at the same rate with small Doppler differences ignored.

Per channel, arbitrary resampling is used, and since the resampling ratio must be carefully matched, no straightforward P/Q clock divider circuit is suitable. Instead, a version of a Direct Digital Synthesizer (DDS) circuit is used in this embodiment. The DDS is based on the DDS circuit used in the Carrier Generation module, wherein the look-up table sine and cosine generators are removed. Instead, the Most Significant Bit (MSB) of the "LUT address" output of the accumulator becomes the clock signal for the input port. For example, using a 32-bit "tune word" to run the accumulator, sufficient chip phase accuracy can be maintained over the processing interval. Each input channel has its own clock generator (each input can be at a separate Doppler). Because the resampling ratios will generally be no higher than 5:1, the accumulators cannot be multiplexed among multiple channels. One effect to note with this resampling scheme is that the bit transitions may not be as precise as those transmitted naturally. On average however, they are sufficiently accurate, and in typical receiver implementations the same loss of precision occurs in the sampling of the received signal. It does point to a requirement that the sampling rate (and output bandwidth) of the simulated signal must equal or exceed that of the receiver.

The synchronization and resampling address the access of the correct $X_i$ for each output sample. The carrier generation block provides the output of the complex exponential in the equation. The correct cosine (inphase, or I) and sine (quadrature, or Q) values are generated by a standard DDS core. The core used in this implementation allows parametric choice of the number of bits of precision in the "tune word" and phase offset along with the number of phase states to generate and the number of bits of I and Q (signed integers) to output. Also, this DDS core allows the multiplexed output of up to a number of independent channels, such as 16 channels (sharing the same bit-width parameters).

One embodiment for phase truncation in DDS proceeds as follows. The Combiner algorithm takes the propagation information and uses it to derive the initial phase ($2\pi\phi_i$ in the equation; POFF when translated to the DDS) and the per-sample increment ($2\pi\Delta f_i\Delta t$, translates to PINC). These values are updated every processing interval. Since GPS signals are generally below the noise and only become detectable after much averaging, the phase angle resolution and amplitude resolution can be moderately coarse. The core generator module allows the designer to specify a Spur Free Dynamic Range (SFDR). The width of the PINC, POFF, and PACC registers (and by implication the DATA bus for loading them) is determined by the desired frequency accuracy.

Scaling the outputs is typically a fairly straightforward process. However, some of the features of the implementation lent themselves to optimization. As mentioned in the above section, the DDS used for carrier generation is multiplexed and the sine and cosine output on a given clock cycle is the sine and cosine for one specific channel. The scale factor being applied to each channel is typically fixed over the processing interval. Thus, one hardware multiplier can be time-shared among the channels. The bits (signed) of sine or cosine are multiplied by an unsigned scale factor to provide the bits of signed data. For example, allocating 10 bits to scale factor provides about 60 dB of amplitude dynamic range, which is more than sufficient for most purposes.

Since the multiplication by the scale factor is time-shared, it typically does not change rapidly enough to incorporate the BPSK modulation coming from the resampled bit stream $X_i$. In one embodiment, a "bypass" input is fed by the BPSK bit stream such that when the BYPASS pin is a zero (active low), the output is equal to the input. When BYPASS is 1, the output is the twos complement of the input. The core contains a register to allow storage of the time-shared multiplier output.

Each signal stream exiting the BPSK modulator (parallel modulators for the I and Q data), is fed to a large summation block with the output of a Digital Direct Synthesis (DDS) block which generates the Sine and Cosine of the properly Doppler shifted carrier for that signal. Each multiplied and scaled output is then fed to a large summation block for output of the Combiner core. In normal operation, that output will be connected to the DAC on the framework.

As described, the combiner algorithm adds together multiple signals. The individual signals being summed can be represented in the following form from the input digitized signal streams:

$$Y_i(n) = S_i \cdot X_i \left[ \frac{t_0 - t_{i0} - \tau_i + n\Delta t}{\Delta t_i \left(1 + \frac{\Delta f_i}{f_c}\right)} \right] \cdot e^{j2\pi(n\Delta t\Delta f_i + \phi_i)}.$$

$S_i$ represents the (complex) scale factor for that signal component (a mix of overall scale factors and input-specific scale factors); $X_i$ represents the (complex) input signal stream the desired input component refers to; $t_{i0}$ is the start time for the first sample of the input signal; $t_0$ is the start time for the output processing interval; $\Delta t$ is the output sampling interval; $\Delta t_i$ is the input sampling interval for that stream; $\tau_i$ is the total propagation delay to be applied to this signal component; $\Delta f_i$ is the Doppler shift to be applied to this signal component; $f_c$ is the carrier frequency; and $\phi_i$ is the propagation phase shift to be applied to the first sample. It consists of the integrated Doppler from previous processing plus any additional phase shift requested.

One of the unique aspects of this combiner algorithm is that multiple output components can be specified from the same input signal; each output will have unique scale, delay, Doppler, and phase terms applied.

The combining algorithm function is performed in a block processing fashion. This allows the equation above to remain fairly simple as needed for both software and framework implementations of the algorithm. For each processing interval (controlled by parameters), the dynamic propagation state information is updated to the current output start time. The Doppler shift applied over the processing interval is that for the midpoint of the processing interval (taking frequency derivative into account). Note also that the Doppler shift affects the resampling factor, wherein this carrier-to-code Doppler correction is used to maintain proper signal coherence.

The Referring again to the flowchart in FIG. 5, the signal processing will depend somewhat upon the application and the configuration, but typically consists of various steps including: synchronization, resampling, carrier frequency adjustment, multipath application, scaling, modulating and then summating of the multiple input streams to form the single output. It should be understood that not all the steps are required as different applications may require different resources. In addition, the order of the steps in the figure and description is not to be considered sequential and may occur out of sequence.

As noted, the synchronization step 510 in the combining process is to select the correct portion of each input signal stream $X_i$ for access in creating the output streams for summation. In software-only mode, this process is made simpler by the random-access nature of computer memory. The synchronization process needs to ensure the correct block of input data is visible. For each input stream, the Combiner computes the nominal delay and then finds the maximum and minimum multipath delays around the core value. The earliest needed sample is the start time of the output ($t_0$) minus the maximum delay. As long as $t_{i0}$ is earlier than that value, the needed sample is in view. The last needed sample is $t_0$ plus $N\Delta t$ minus the minimum delay.

In one embodiment, two blocks of input data are kept in the buffer to provide access to the earliest needed, the last needed, and all samples in between. If the multipath delay span is too large and not all samples can be kept, an error is reported and the offending signal is temporarily dropped from the list.

Processing is done in programmable-length blocks. There is a small period between blocks, during which the software updates the FPGA processing parameters. Thus, the FPGA runs faster than the average sample rate, and rate matching is achieved using FIFO buffers. FIFO buffers to accommodate block processing can be employed. The high speed portions of the signal processing are performed in an FPGA using the present architecture detailed herein.

According to one example, the software Combiner algorithm takes in I and Q (complex) data, such as signed 16-bit, at whatever rate the source code generator selects. The framework can take in 1-bit data (BPSK signaling assumed) at whatever native rate the associated code generator runs at. In the case of GPS satellite simulation, this means the total L1 signal (C/A and P codes) must be broken into two streams. The P code stream typically runs at 10 times of a higher sample rate. "Side channel" data is passed to the Combiner software and notifies it of the input signal configuration. In a further embodiment, the framework supports memory requirements and memory resources as detailed herein.

A careful examination of the synchronization logic shows that the latest needed sample at the start of the processing block determines what sample should be present at the input port at the start of the processing cycle. All signal components referring to an earlier sample (e.g., a multipath term that is delayed from the core) share the same input stream but pick a nonzero sample index from the SRL. Once processing starts, all outputs derived from one input pull data at the same rate wherein small Doppler differences are ignored.

As previously noted, in order to obtain the correct sample at the input port at the start of processing, a "pre-fetch" capability is implemented. The countdown counter at the beginning holds the main processing for a number of clock cycles to fetch the requisite number of data samples from the input port. Once all channels have counted down to zero, normal processing commences.

In the resampling step 520, the resampling takes the input stream(s) (at any arbitrary rate) and individually resamples them to a common output rate. The input sampling rate of each channel is compensated for the Doppler shift on that signal based on the ultimate carrier frequency. The input channels are individually time aligned to support eventual addition; blocking flow control is applied to each input port.

Unlike a GPS satellite payload, a general software radio does not have an atomic clock driving the output modulation. Furthermore, due to the channel-specific Doppler shift occurring in the simulation scenario, the input bit stream from a SDR will always be at some non-ideal ratio of the master clock. Therefore, a per channel, arbitrary resampling module can be used. Since the resampling ratio must be carefully matched, the straightforward P/Q clock divider circuit is discouraged. Instead, a more stable and accurate clocking is required, such as a variation of a Direct Digital Synthesizer (DDS) circuit. In fact, based on the DDS circuit used in the Carrier Generation module; the look-up table sine and cosine generators can be removed. Instead, the Most Significant Bit (MSB) of the "LUT address" output of the accumulator becomes the clock signal for the input port.

Carrier frequency adjustment 530 applies the desired Doppler shift on each signal. The first two elements addressed the access of the correct $X_i$ for each output sample. The carrier generation block provides the output of the complex exponential in the equation. In one embodiment, the correct cosine inphase (I) and sine quadrature (Q) values are generated by a standard DDS core. The core used in this implementation allows parametric choice of the number of bits of precision in the "tune word" and phase offset along with the number of phase states to generate and the number of bits of I and Q (signed integers) to output. Also, this DDS core allows the multiplexed output of up to 16 independent channels (sharing the same bit-width parameters).

The Multipath application 540 is an optional special feature of the Combiner. For each input stream, one can activate one or more copies of the "carrier" component. Each copy can be individually given an extra time, Doppler, and/or phase shift along with a relative scale factor. These copies are added together for output. The carrier can be disabled if desired. The number of total signal components (carrier and multipath) can be limited for ease of processing.

Scaling 550 is applied to each channel, and globally to account for the dynamic range of the output stream. Scaling the outputs is typically a fairly straightforward process. However, some of the features of the implementation lent themselves to optimization. As mentioned in the above section, the DDS used for carrier generation is multiplexed to save space. Thus, the one sine and cosine output on a given clock cycle is the sine and cosine for one specific channel. The rest of the outputs are (virtually) held steady. This is satisfactory from a signal processing point of view since the sine and cosine values do not change rapidly (the angular frequency per sample $2\pi\Delta f_i \Delta t$ is well below $\pm\frac{1}{16}$). The scale factor being applied to each channel is held fixed over the processing interval. Thus as an example, one hardware multiplier can be time-shared among 16 channels. The six bits (signed) of sine or cosine are multiplied by a 10 bit unsigned scale factor to provide 16 bits of signed data. Allocating 10 bits to scale factor provides about 60 dB of amplitude dynamic range.

Modulating is the next step 560, wherein in one embodiment it is done by the 2's complement section. Since the multiplication by the scale factor is time-shared, it does not change rapidly enough to incorporate the BPSK modulation coming from the resampled bit stream $X_i$. In one embodiment, a "bypass" input can be fed by the BPSK bit stream, wherein the core can use a register to allow storage of the time-shared multiplier output as noted in the Scaling description.

Finally, once all the input streams are appropriately synchronized and sampled to the common time base, they are summed for output. The signal is converted to L Band and transmitted. This conversion is coordinated by a "bridge" component. Under certain conditions, the bridge may need to apply small frequency shifts to account for quantization of the hardware upconvertor.

One benefit of the object oriented architecture is its modularity such that in the relatively small FPGA, it is possible to quickly combine various code generators into one core sharing one base interface. A challenge of software defined radio is lack of timing precision, and the controlling processes that use First-In, First-Out (FIFO) memories as buffers. But, the Combiner of the present invention runs faster than real time in order to "catch up" if any delay occurs. Thus, once the Combiner catches up to real time, it starts filling the FIFO buffer such that when the FIFO hits an "Almost Full" state, the Combiner must hold on sending data and wait until the FIFO has more room. This requirement is difficult when the processing is deeply pipelined and takes a number of clock cycles to execute. One embodiment of the present invention pipelines the block in parallel with the data and takes advantage of the framework rules, wherein components stop sending data one clock after a block is asserted, wherein the Combiner sends additional samples and the FIFO has sufficient headroom to absorb this additional data.

The system framework provides a "Simple Task" file-driven method to deploy and operate components; it is very useful for single-component test or simple demonstrations. Once more elaborate control is needed, a custom task written in Java is required to deploy, control, and monitor groups of components. The Task also serves as the gateway to the user, either via an integral GUI or via a connection to the user(s) via an API.

The present invention provides a framework for the implementation of a software defined navigation system capable of hosting one or more functions on any compatible suite of products. As such, this invention facilitates leveraging work on platform-independent programs. Besides the COTS-based architectures for air, ground, and sea-based systems, the present invention is able to host these functions on software-defined payloads.

One usage is for navigation signal generation architecture for the support of NAVWAR Electronic Protection, Electronic Attack, and Electronic Support missions within a flexible, object oriented framework employing reconfigurable components. In this context, an architecture consists of a set of functional blocks, the interfaces between them, and a set of use cases for their deployment and management.

A further implementation of the present invention is as a radionavigation signal simulator within the same flexible architecture. Some unique aspects of this signal simulator are the ability to synchronize to real time, to use live GPS almanac and ephemeris data to alter the simulated locations of a multiple of transmitters in real time, and to allow similar changes to the simulated receiver location in real time. The present invention is suitable for a family of radionavigation-related waveforms related to the NAVWAR architecture. One of the waveforms in particular is suitable for space-based applications such as the GPS Block III.

An additional embodiment of the invention is as a software defined GPS anti-jam "pseudolite" waveform generator and operations architecture. Additional aspects include a radionavigation signal generation and processing cores implemented in the flexible FPGA framework.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for software defined radio navigation, comprising:
 a framework having a hardware independent interface said hardware independent interface being a standardized software interface whereby software interfaces with said framework and a hardware dependent interface between said framework and hardware, such that said framework interfaces with hardware through hardware interfaces required by said hardware, and said framework communicating with at least one bus;
 a processing section coupled to said framework and processing a set of input navigation data into a set of processed navigation data, wherein said processing section includes at least one software defined radio component, and wherein said component is deployable independently of device specific hardware interfaces of said hardware; and
 a transmitter section coupled to said framework, transmitting said processed navigation data.

2. The system according to claim 1, further comprising a receiver section coupled to said framework, receiving said input navigation data.

3. The system according to claim 1, wherein said software defined radio component is selected from at least one of the group consisting of: red side processor, infosec, and black side processor.

4. The system according to claim 1, wherein said system is a pseudolite.

5. The system according to claim 1, wherein each said component is comprised of a core application and a respective component virtual interface, wherein said core and said component virtual interface are hardware independent;
a target platform interface interacting with said component,
wherein said target platform interface is hardware specific and binds said component to a Field Programmable Device (FPD), and wherein said target platform interface is coupled to a framework manager.

6. The system according to claim 1, further comprising a combiner, said combiner providing phase, frequency and time offset compensation.

7. The system according to claim 6, said combiner further providing at least one multipath.

8. A navigation signal generator, comprising:
a receiver section receiving a plurality of input navigation signals, said receiver section comprising:
a plurality of receiver antenna elements; and
a global navigational satellite system (GNSS) receiver section;
a processing section processing said input navigation signals, said processing section comprising a set of software defined radio processing elements and a combiner implemented in a field programmable device, said processing section generating a summed single output navigation signal;
a transmitter section having a plurality of transmitter antenna elements for transmitting said output navigation signal; and
a framework wherein said software defined radio processing elements and said combiner are components that are deployable independently of device specific hardware interfaces of said field programmable device.

9. The signal generator according to claims 8, wherein said transmitter antenna elements and said receiver antenna elements are the same.

10. The signal generator according to claims 8, wherein said processing section comprises at least one of the group consisting of: MilGPS, navigation bridge, navigation server, red side processor, infosec, black side processor.

11. The signal generator according to claims 8, further comprising a transmit bridge about said software defined radio processing elements.

* * * * *